United States Patent [19]

Driver

[11] Patent Number: 5,201,628
[45] Date of Patent: Apr. 13, 1993

[54] MANUALLY OPERATED PICKUP TRUCK HOIST

[76] Inventor: Wilfred D. Driver, 357 East 28th Street, Hamilton, Ontario, Canada

[21] Appl. No.: 822,155

[22] Filed: Jan. 17, 1992

[51] Int. Cl.$^5$ .............................................. B60P 1/43
[52] U.S. Cl. .................................... 414/538; 254/385; 254/399; 296/61
[58] Field of Search ................ 414/537, 538, 341, 345, 414/559; 296/61, 62, 55; 14/71.1, 71.3; 254/385, 399; 242/100.2

[56] References Cited

U.S. PATENT DOCUMENTS

| | | | |
|---|---|---|---|
| 2,131,402 | 9/1938 | King | 414/538 |
| 2,653,845 | 9/1953 | Benjamin | 296/61 |
| 2,727,781 | 12/1955 | D'Eath | 414/537 X |
| 3,339,968 | 9/1967 | Hall | 296/61 |
| 3,352,440 | 11/1967 | Wilson | 414/537 |
| 3,642,156 | 2/1972 | Stenson | 414/537 |
| 3,713,553 | 1/1973 | Curtis et al. | 414/537 |
| 3,809,266 | 5/1974 | Salerni | 414/538 X |
| 3,913,763 | 10/1975 | Lee | 414/537 X |
| 3,976,209 | 8/1976 | Burton | 414/537 |
| 4,647,270 | 3/1987 | Maloney | 296/61 X |
| 4,735,454 | 4/1988 | Bernard | 296/61 |
| 4,944,546 | 7/1990 | Keller | 414/537 X |
| 5,105,915 | 4/1992 | Gary | 14/71.3 |

FOREIGN PATENT DOCUMENTS

| | | | |
|---|---|---|---|
| 76009 | 7/1961 | France | 414/537 |
| 1409452 | 7/1965 | France | 414/538 |
| 844855 | 8/1960 | United Kingdom | 414/537 |

Primary Examiner—David A. Bucci
Attorney, Agent, or Firm—Laurence R. Brown

[57] ABSTRACT

A manual powered hoist and ramp system for pickup trucks enables a single person to lift heavy objects located on handtrucks or dollies onto the loading platform of the truck. The truck tailgate has a pivoted flap extension to form a ramp inclined from the truck loading platform to the ground when pivoted into its opened ramp position with the flap extended. An accompanying hoist has a counterforce mechanism mounted on a pair of elevated stanchion posts on opposite sides of the truck loading platform for producing an upward assisting lifting force establishing tension in a line extending to the ground for attachment to a handtruck or dolly. That force directed substantially parallel to the ramp tending to move the load up the ramp thus enables a single person to handle a heavier load, such as a refrigerator, for hoisting onto the truck platform. The hoist is manually powered and thus stores a force in the counterforce mechanism as the line is extended to ground level to attach to a loaded hand truck or the like. The counterforce mechanism relies upon the weight of lead masses or the like to provide enough lifting force that a single person can manipulate safely larger loads between ground level and the truck platform. The hoist-ramp assembly stores on a pickup truck to convert it to a one person moving vehicle capable of moving large, heavy furniture pieces such as refrigerators.

4 Claims, 3 Drawing Sheets

MANUALLY OPERATED PICKUP TRUCK HOIST

TECHNICAL FIELD

This invention relates to pickup truck accessories and more particularly it relates to ramp and hoist accessories for moving heavy objects from the ground to the pickup truck loading platform.

BACKGROUND

For loading pickup trucks with heavy objects, such as refrigerators usually moved on dollies or hand trucks, it has been customary to pick up the objects and lift them to the truck loading platform. For larger, heavier loads and larger size objects generally encountered in moving or delivering furniture, this has required two persons, thus limiting the utility of the truck for this purpose and imposing a high labor cost.

Even if auxiliary ramps and power assist hoists were available for use when needed on heavier loads, such would not be particularly adaptable to the peculiar characteristics of pickup trucks. For example, how would ramps and or hoists be anchored to the truck body? Or where would such equipment be stored? And how much setup time would be required to use such auxiliary equipment? Under such circumstances, the use of accessories for expanding the utility of pickup trucks has not become common.

It is a further problem that affects the complexity, operability and expense of powered hoists for loading trucks that electric or hydraulic motor power is conventionally required. Thus, there are no known unmotored power hoist assists specifically applicable for use in and on pickup trucks.

It is therefore a general object of this invention to increase the utility of pickup trucks for moving heavy and awkwardly sized loads.

It is another object of this invention to increase the load capacity that a single person can handle when loading heavy and bulky objects on the loading platform of a pickup truck.

It is a more specific object of this invention to provide a built in hoist-ramp accessory for pickup trucks that provides for partially hoisting a loaded wheeled dolly or hand truck upwardly to the loading platform of the truck without requiring electric or hydraulic motors.

Other objects, features and advantages of the invention will be found throughout the following description, drawings and claims.

DISCLOSURE OF THE INVENTION

Thus, this invention provides a built in ramp assembly accessory for a pickup truck formed in part by its tailgate, which is mounted to pivot more than ninety degrees from a closed vertical retaining position to an open loading position inclined downwardly toward the ground. Thus the tailgate, together with an extension flap that extends the tailgate to touch the ground, when inclined from the rear of the truck downwardly, forms a ramp between the ground and the truck loading platform. Wheeled dollies and hand trucks can therefore carry large loads up the ramp for resting upon the truck loading platform for carriage.

However, the ramp is steep over a lift distance of several feet so that heavy and bulky items such as a refrigerator or other furniture generally require two persons for loading. Thus, to increase the load that can be safely and readily handled by one person, a powered assist mechanism is provided for helping a single person to move a heavy load up the ramp on a wheeled hand truck or the like. Thus, counterforce means are provided on the truck loading platform for helping to pull a loaded wheeled dolly or hand truck up the ramp. In accordance with this invention, a motorless manual assist mechanism is provided for this purpose, without necessitating a power source.

Accordingly two pipe like mounts extend above the truck platform on opposite sides critically positioned to extend above the plane of the inclined ramp so that a line such as a chain or cable may be disposed between the mounts and a hand truck axle, for example, substantially parallel to the ramp. In this manner a maximum force may be exerted to pull the hand truck up the ramp by means of tension in the line exerted by load counterforce means attached to the line. In a preferred embodiment this is achieved by means of heavy weights, such as lead, freely movable up and down the mount pipes and coupled to the line when passed over a pulley to provide a lift force from the weights that assist the loader to move heavy object up the ramp. The movement span of the weights is substantially equal to the ramp length. The line has a connector such as a hook that fits over a hand truck axle, for securing the line to the load.

In operation therefore part of the load lifting energy is stored in the weights as the loader pulls the line down the ramp to couple it to the handtruck axle. Then, the force exerted by the loader to overcome gravity and move the handtruck up the ramp is decreased so that the loader can safely handle larger loads. The ramp and the hoist assemblies are both accessories resident in the pickup truck for immediate use whenever needed without substantial bother and take up little space. Fittings on the truck body brace and support the ramp for carrying the loaded hand trucks up the ramp.

BRIEF DESCRIPTION OF THE DRAWINGS

Throughout the several views, like reference characters refer to similar features to facilitate comparison.

THE PREFERRED EMBODIMENT

Figure 2:
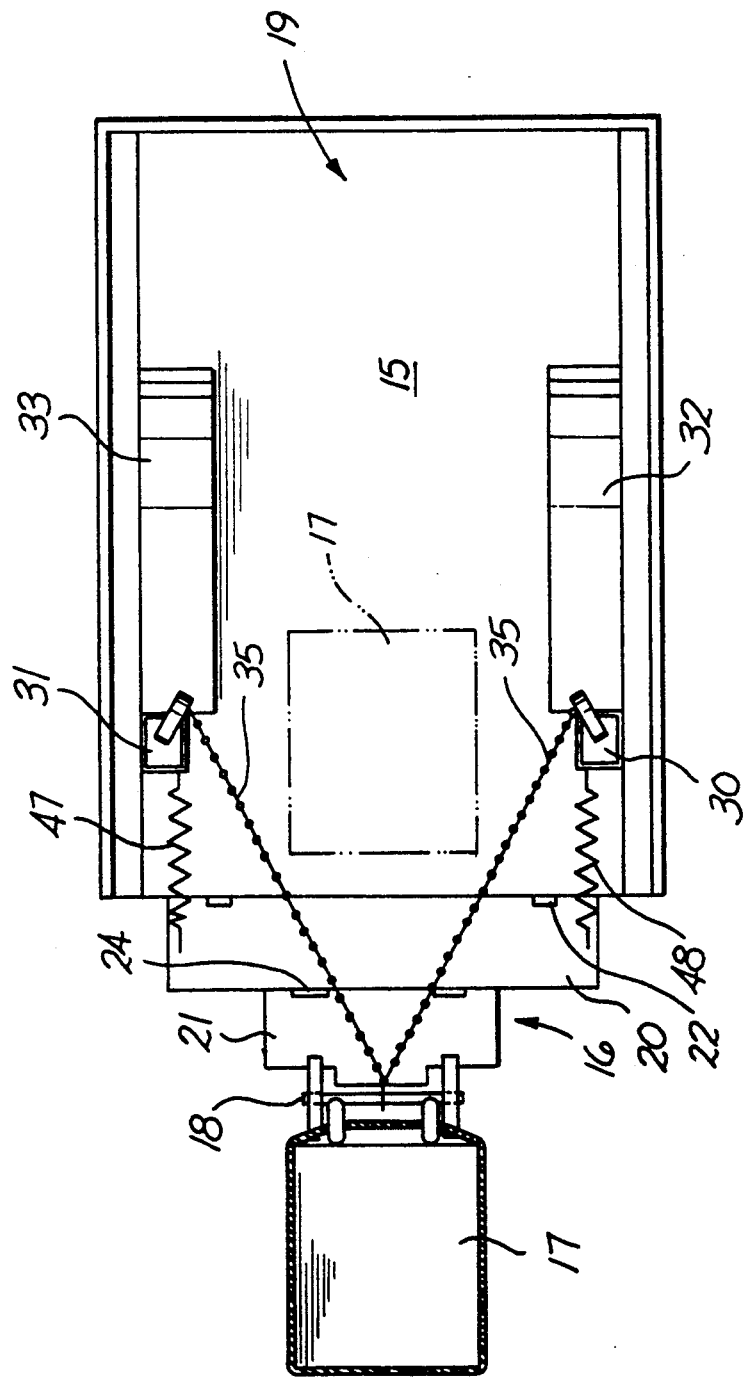
FIG. 2 is a top fragmental view of the pickup truck as shown in FIG. 1.

The rear portion of pickup truck 15 is shown with a loading ramp 16 in use to move a refrigerator 17 located on hand truck 18 up on the loading platform 19 of the truck 15. The ramp 16 has two basic parts, the tailgate 20 and the flap extension 21, and is hinged at 22 to pivot more than ninety degrees to incline downwardly to the ground. The ramp 16 is supported by braces and fittings (not all shown) for strengthening the ramp 16 and locking it in position, which for example includes a bumper-like support bracket 25 extending from the rear of the truck body. This may require a bumper to be repositioned and/or shaped to fulfill the supporting bracket function. The extension flap 21 need not be as wide as the tail gate 20, as better seen in FIG. 2, as long as the wheel span of the dollies or hand trucks are accommodated.

A manually loaded assist hoist assembly is provided by means of two hollow square pipe stanchion posts 30, 31 respectively located just behind the wheel wells 32, 33. The height is such that a line 35, shown here as a chain, extends therefrom to the axle 34 of the hand truck 18 over a path substantially parallel to the ramp 16. Thus, a maximized lifting force may be exerted on the load with tension in the line 35. That tension is provided by the lead weights 36, which freely fall undamped within the pipe 30, by means of a pulley 40 (FIG. 3), for example, about which the line 35 passes.

Figure 1:
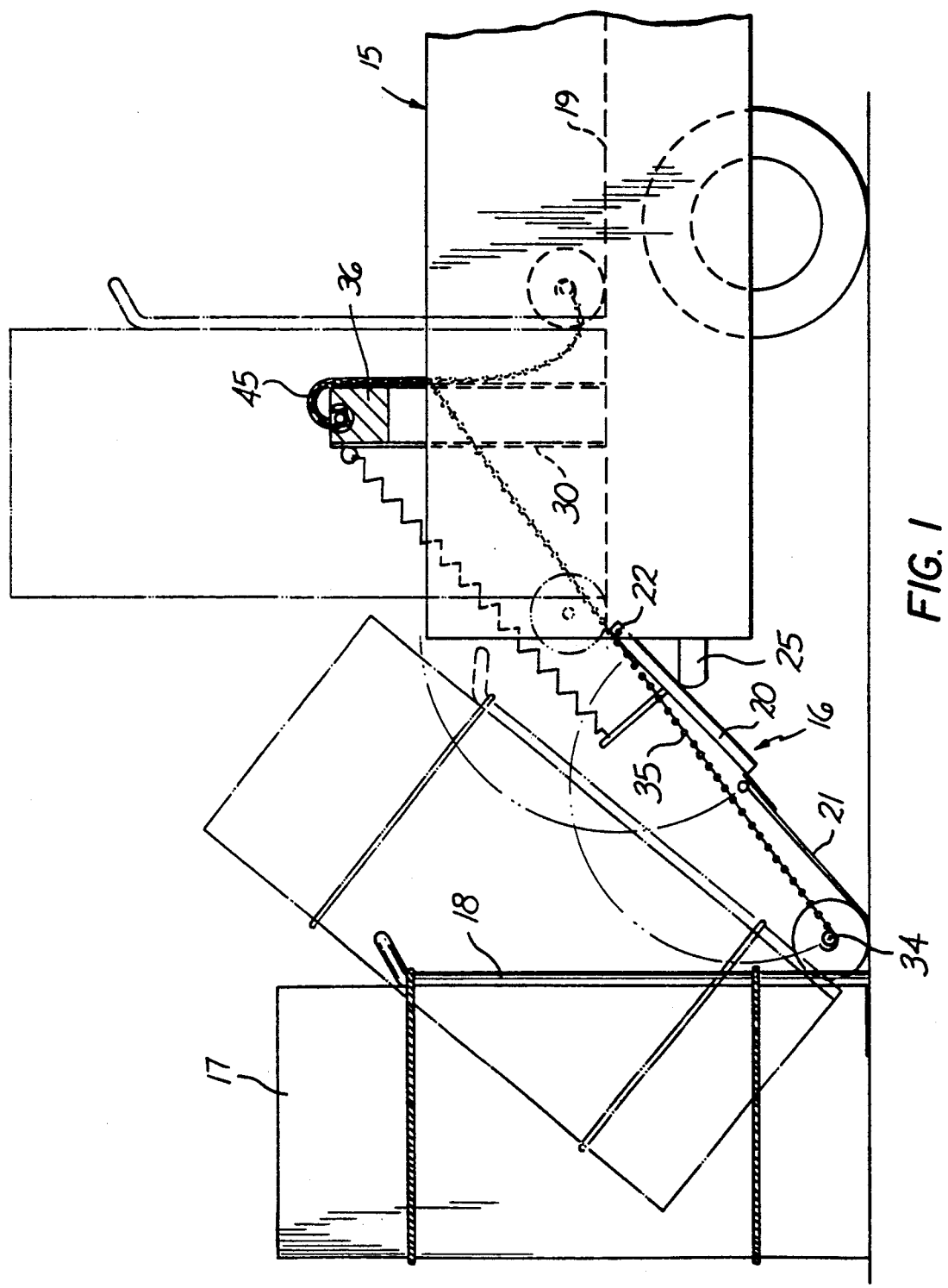
FIG. 1 is a side view sketch, partly in phantom, of a pickup truck fragment with an installed ramp-hoist accessory in use with the ramp in place and inclined downwardly to assist a single person in moving a refrigerator up the ramp to be loaded on the truck platform.
Figure 3:
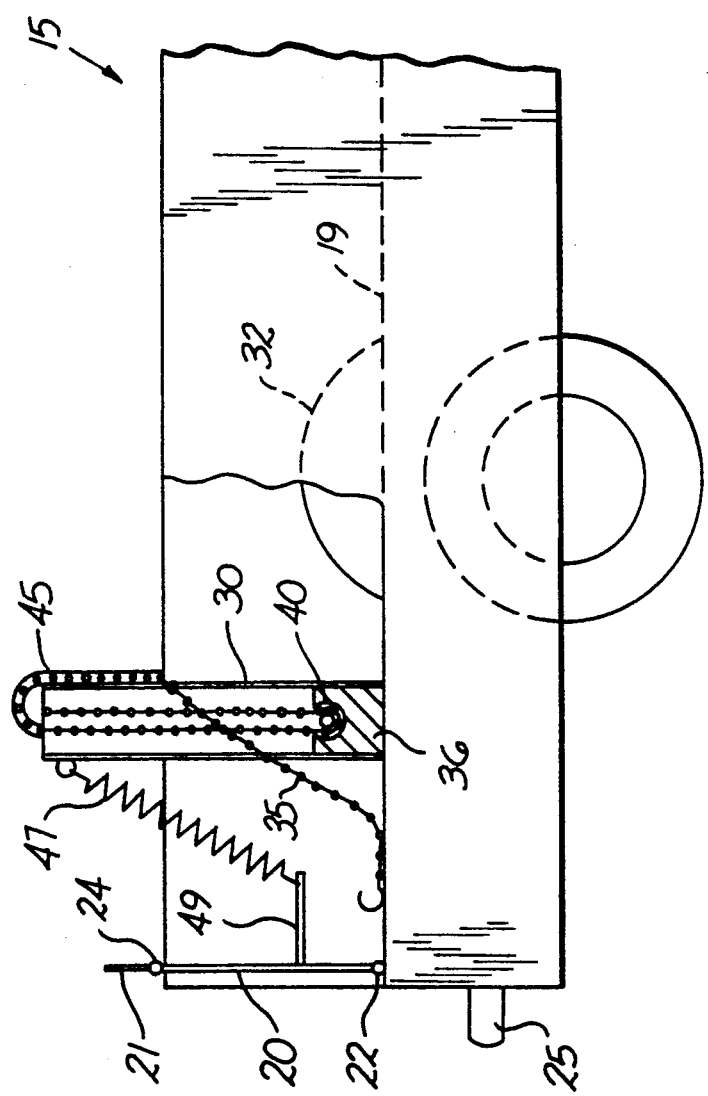
FIG. 3 is a side view sketch of the truck with a closed tailgate illustrating ramp and hoist accessories storage in residence on the truck.

Thus, with reference to FIG. 3, it may be seen that after the ramp is formed from the tailgate 20, the line 35 may be manually extended to the bottom of the ramp to the hook 42 over the axle 34 of the hand truck (FIG. 1), thereby to raise the lead weights 36 to the top of the pipe 30. Thus, the tension is provided in line 35 to assist the loaded hand truck 18 up the ramp 16, while the weights 36 fall downwardly inside pipe 30 by the weight of gravity. This pulley system is preferred over a more expensive and harder to store spring loaded counterforce means arranged for pulling the load upwardly.

As seen from FIG. 3, the line 35 is attached to the top of the pipe 30 and passes over the pulley 40 carried by the lead weights 36 to permit vertical movement of the lead weights 36. The chain line 35 is guided by guide channel 45 with appropriate entrance and exit channels (not shown) to orient the line 35 substantially parallel to the ramp 16. The two lead weights 36 therefore can exert enough force in the lines 35 to permit a single person to safely and conveniently handle much larger and bulkier loads alone than heretofore feasible.

In storage position, the hoist and ramp take up little space. The springs 47, 48 are arranged at the sides of the truck body to attach between stanchion posts 49 on the tailgate 20 and the upper region of the elevated pipe 30 or like elevated weight guide, and serve the purpose of lifting the tailgate from the ramp position to the closed position, where it normally serves as a retainer for the loaded truck platform 19. The extension flap 21 may be pivoted at 24 on tailgate 20 to fold and rest substantially parallel to the tailgate 20 in the closed storage position.

Having therefore set forth the construction of a preferred embodiment of the invention, its operation and its improvement to the art, those features descriptive of the spirit and nature of the invention are set forth with particularity in the following claims.

I claim:

1. A manually operable pickup truck hoist system for power assisting wheeled dollies up a ramp onto the truck loading platform, comprising in combination:
   a tailgate pivoted on said truck,
   ramp forming means for holding the tailgate as a ramp element inclined downwardly from said loading platform towards the ground,
   flap means movable on the tailgate for rigidly extending the tailgate to the ground as a loading ramp,
   a wheeled dolly for moving up the ramp element with a load,
   line feed means for extending and withdrawing a load bearing pulley line,
   mount means for the line feed means affixed to the truck and extending above the loading platform,
   positioning means for extending the line from the mount means to connect with the dolly in the vicinity of the ground for moving it up the loading ramp,
   counterforce means attached to the line in the vicinity of the mount means to produce a lifting tension force in the line when connected with the dolly as it moves from the ground to the loading platform, and
   securing means for attaching the pulley line to said wheeled dolly for exerting a counterforce for movement of the dolly up the loading ramp.

2. The hoist system of claim 1 wherein said counterforce means further comprises,
   counterweight means mounted in said mount means above the loading platform to move up and down in coordination with movement of the line along the loading ramp.

3. The hoist system defined in claim 1 further comprising spring means exerting a force for lifting the tailgate from the downwardly inclined position to a closed tailgate position.

4. A manually powered hoist assembly for mounting on a pickup truck platform for exerting a force for moving a wheeled load bearing dolly up a ramp from ground level to the truck platform, comprising in combination,
   a pair of stanchions for mounting on the truck platform to extend thereabove a distance for feeding a line alongside a ramp placed between the ground and the truck platform,
   line feeding means extending a load bearing line from the stanchions to the ground for coupling onto said wheeled dolly and retrieving the line as the conveyance climbs the ramp, and
   counterforce means to maintain a tension force in the line for assistance in pulling the dolly with load up the ramp comprising means for moving weighted bodies up and down along said stanchions.

* * * * *